US010266637B2

(12) United States Patent
Yamada et al.

(10) Patent No.: US 10,266,637 B2
(45) Date of Patent: Apr. 23, 2019

(54) POLYURETHANE-MODIFIED EPOXY RESIN, METHOD FOR PRODUCING SAME, EPOXY RESIN COMPOSITION AND CURED PRODUCT

(71) Applicant: NIPPON STEEL & SUMIKIN CHEMICAL CO., LTD., Tokyo (JP)

(72) Inventors: Eisuke Yamada, Toyota (JP); Naoki Yokoyama, Sodegaura (JP); Tohru Kunitake, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 88 days.

(21) Appl. No.: 15/315,215

(22) PCT Filed: Jun. 2, 2015

(86) PCT No.: PCT/JP2015/065920
§ 371 (c)(1),
(2) Date: Nov. 30, 2016

(87) PCT Pub. No.: WO2015/186707
PCT Pub. Date: Dec. 10, 2015

(65) Prior Publication Data
US 2017/0198085 A1 Jul. 13, 2017

(30) Foreign Application Priority Data

Jun. 3, 2014 (JP) ................. 2014-115063
Jan. 21, 2015 (JP) ................. 2015-009681

(51) Int. Cl.
*C08G 18/58* (2006.01)
*C08G 59/14* (2006.01)
*C08G 59/22* (2006.01)
*C08G 18/12* (2006.01)
*C08G 18/76* (2006.01)
*C08G 59/42* (2006.01)
*C08L 63/00* (2006.01)
*C08L 75/08* (2006.01)
*C08G 18/48* (2006.01)
*C08G 18/64* (2006.01)
*C08G 59/40* (2006.01)
*C08G 59/20* (2006.01)
*C08G 18/66* (2006.01)
*C08G 18/40* (2006.01)

(52) U.S. Cl.
CPC ............. *C08G 18/58* (2013.01); *C08G 18/12* (2013.01); *C08G 18/4081* (2013.01); *C08G 18/4825* (2013.01); *C08G 18/6407* (2013.01); *C08G 18/6674* (2013.01); *C08G 18/7671* (2013.01); *C08G 59/14* (2013.01); *C08G 59/20* (2013.01); *C08G 59/4028* (2013.01); *C08G 59/4238* (2013.01); *C08L 63/00* (2013.01); *C08L 75/08* (2013.01); *C08G 59/1433* (2013.01); *C08G 59/1477* (2013.01)

(58) Field of Classification Search
CPC ........ C08G 18/58; C08G 59/14; C08G 59/20;
C08G 18/12; C08G 18/6674; C08G
18/7671; C08G 59/4238; C08G 18/4825;
C08G 18/6407; C08G 59/4028; C08G
18/4081; C08G 59/1433; C08G 59/1477;
C08L 63/00; C08L 75/08
USPC ....................................................... 525/528
See application file for complete search history.

(56) References Cited

U.S. PATENT DOCUMENTS

| 4,576,726 A | * | 3/1986 | Watanabe | ............ C08G 18/58 252/62.54 |
| 5,447,973 A | | 9/1995 | Yamada et al. | |
| 2010/0035041 A1 | | 2/2010 | Kramer et al. | |

FOREIGN PATENT DOCUMENTS

| CN | 101798492 A | * | 8/2010 | ............ C09J 151/08 |
| JP | 6-271827 A | | 9/1994 | |
| JP | 6-329755 A | | 11/1994 | |
| JP | 10162348 A | * | 6/1998 | ............ G11B 5/702 |
| JP | 2007-224144 A | | 9/2007 | |
| JP | 2007-284467 A | | 11/2007 | |
| JP | 2007-284474 A | | 11/2007 | |
| JP | 2010-507709 A | | 3/2010 | |

(Continued)

OTHER PUBLICATIONS

Meguro et al., JP 10-162348 A machine translation in English, Jun. 19, 1998 (Year: 1998).*

(Continued)

*Primary Examiner* — David T Karst
(74) *Attorney, Agent, or Firm* — Birch, Stewart, Kolasch & Birch, LLP

(57) ABSTRACT

Provided are a polyurethane-modified epoxy resin composition having satisfactory operability of processing, such as casting or impregnation, in a composition state, a production method therefor, and a composition thereof. The polyurethane-modified epoxy resin is obtained by modifying a secondary hydroxyl group-containing bisphenol-based epoxy resin (a) having an epoxy equivalent from 150 g/eq to 200 g/eq and a hydroxyl equivalent from 2,000 g/eq to 2,600 g/eq with a polyol compound (b) having an Mn of 200 or more, a polyisocyanate compound (c), and a polyol compound (d) having an Mn of less than 200 serving as a chain extender. The polyurethane-modified epoxy resin uses the epoxy resin (a) in an amount from 20 wt % to 60 wt % with respect to the total amount of the respective components (a), (b), (c), and (d), and contains a polyurethane having the epoxy resin (a) added to both terminals thereof and/or one terminal thereof.

8 Claims, No Drawings

(56) References Cited

FOREIGN PATENT DOCUMENTS

| JP | 2012-219223 A | 11/2012 |
|----|---------------|---------|
| JP | 2013-73064 A  | 4/2013  |
| JP | 2014-77074 A  | 5/2014  |

OTHER PUBLICATIONS

Deng et al., CN 101798492 A machine translation in English, Aug. 11, 2010 (Year: 2010).*
English translation of the International Preliminary Report on Patentability (Form PCT/IPEA/409), dated Nov. 25, 2016, for International Application No. PCT/JP2015/065920.
International Search Report, issued in PCT/JP2015/065920, PCT/ISA/210, dated Aug. 18, 2015.
Written Opinion of the International Searching Authority, issued in PCT/JP2015/065920, PCT/ISA/237, dated Aug. 18, 2015.

* cited by examiner

POLYURETHANE-MODIFIED EPOXY RESIN, METHOD FOR PRODUCING SAME, EPOXY RESIN COMPOSITION AND CURED PRODUCT

TECHNICAL FIELD

The present invention relates to a novel polyurethane-modified epoxy resin, a polyurethane-modified epoxy resin composition obtained by blending the polyurethane-modified epoxy resin with a polyurethane-unmodified epoxy resin for adjusting a polyurethane concentration, a curing agent, and a curing accelerator, and a cured product thereof.

BACKGROUND ART

An epoxy resin is excellent in processability, and various cured product characteristics, such as high heat resistance, high insulation reliability, high rigidity, a high adhesive property, and high corrosion resistance, are brought out of the resin. Accordingly, the resin has been used in a large amount in various applications, such as an electrical insulating material (casting, impregnation, a laminated plate, or a sealing material), a matrix resin for a composite material like a CFRP, a structural adhesive, and a heavy duty coating.

In contrast, an epoxy resin cured product has a low rupture elongation property, low fracture toughness, and low peel strength. Accordingly, in the application of a matrix resin for a composite material and the application of a structural adhesive where those characteristics are required, the characteristics have been improved by various kinds of modification, such as rubber modification and polyurethane modification.

In each of Patent Literature 1 and Patent Literature 2, there is a disclosure that an epoxy resin composition obtained as described below has high shear strength, high peel strength, and high torsional shear strength, and is excellent in adhesive property and impact resistance, and is hence suitable for a structural adhesive for an automobile. In a bisphenol A-type epoxy resin containing a hydroxyl group, a polypropylene diol and isophorone diisocyanate are blended so that the molar ratio "NCO/OH" of NCO groups in isophorone diisocyanate to the total of the OH groups of the bisphenol A-type epoxy resin and the polypropylene diol may be 1.0. A polyurethane-modified epoxy resin thus synthesized is blended with a specific epoxy resin, such as a polyoxyalkylene diglycidyl ether, to provide the composition.

However, in each of the literatures, there is no disclosure that resin characteristics and cured product characteristics are controlled by specifying the loading concentration of the epoxy resin containing a hydroxyl group at the time of the synthesis of the polyurethane-modified epoxy resin. In addition, in each of the literatures, there is no disclosure of data on the viscosity of the composition, and the rupture elongation, fracture toughness, and glass transition temperature of a cured product thereof.

In Patent Literature 3, there is a disclosure that a resin composition containing a urethane-modified epoxy resin obtained as described below serves as a cured product which has a high fracture toughness value and is useful in electrical and electronic applications, and building material applications. In a bisphenol A-type epoxy resin, a specific diol compound and diphenylmethane diisocyanate are loaded and caused to react with each other to provide a urethane prepolymer. After that, 1,4-butanediol serving as a chain extender is loaded to polyurethanate the prepolymer.

However, also in the literature, there is no disclosure that resin characteristics and cured product characteristics are controlled by specifying the loading concentration of the epoxy resin containing a hydroxyl group at the time of the synthesis of the urethane-modified epoxy resin. In addition, in the literature, there is no disclosure of data on the viscosity of the composition and the rupture elongation of a cured product thereof. In the literature, there is a disclosure of data on the fracture toughness and glass transition temperature of the cured product, and a significant improving effect on the former is observed. However, the latter is low for an epoxy resin cured product and hence heat resistance is not sufficient.

CITATION LIST

Patent Literature

[PTL 1] JP 2007-284467 A
[PTL 2] JP 2007-284474 A
[PTL 3] JP 2007-224144 A

SUMMARY OF INVENTION

The present invention is directed to provide a novel polyurethane-modified epoxy resin having the following features, and a resin composition and a cured product thereof. A viscosity at 25° C. when the resin is turned into an epoxy resin composition can be set to fall within the range of 60 Pa·s or less where each of mold casting in a casting material, fiber impregnation in a composite material, and application to an adherend in a structural adhesive can be performed. In addition, in order that the fatigue resistance and peel strength of each of the casting material, the composite material, and the structural adhesive may be improved, a cured product of the resin has a rupture elongation of 5% or more and a fracture toughness of 1.1 MPa·m$^{0.5}$ or more. Further, in order that heat resistance may be retained, the glass transition temperature of the cured product can be set to 110° C. or more.

According to one embodiment of the present invention, there is provided a polyurethane-modified epoxy resin, which is obtained by modifying a bisphenol-based epoxy resin (a) represented by the following formula (1) having an epoxy equivalent of from 150 g/eq to 200 g/eq and a hydroxyl equivalent of from 2,000 g/eq to 2,600 g/eq with a medium to high molecular weight polyol compound (b) having a number-average molecular weight of 200 or more, a polyisocyanate compound (c), and a low molecular weight polyol compound (d) having a number-average molecular weight of less than 200 serving as a chain extender, the polyurethane-modified epoxy resin including a polyurethane having the epoxy resin (a) added to each of both terminals thereof and/or one terminal thereof, the polyurethane being obtained by:

producing a urethane prepolymer (P) by using the epoxy resin (a) in an amount of from 20 wt % to 40 wt % with respect to a total amount of the components (a), (b), (c), and (d), and causing the medium to high molecular weight polyol compound (b) and the polyisocyanate compound (c) to react with each other in a presence of the epoxy resin (a) while using the compounds in such amounts that a molar ratio between primary OH groups of the component (b) and NCO groups of the component (c) falls within a range of from 1:1.5 to 1:3; and then subjecting the urethane prepolymer (P) to a polyurethanation reaction by adding the low molecular weight polyol compound (d) so that a molar ratio between NCO groups of the urethane prepolymer (P) and OH groups of the low molecular weight polyol compound (d) may fall within a range of from 0.9:1 to 1:0.9:

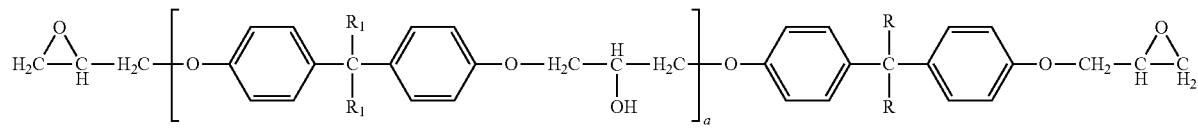

(1)

where R, $R_1$ each represents H or a methyl group, and a represents a number of from 0 to 10.

According to another embodiment of the present invention, there is provided a method of producing the polyurethane-modified epoxy resin, including:

producing a urethane prepolymer (P) sealed with the epoxy resin (a) at each of both terminals thereof and/or one terminal thereof by using a bisphenol-based epoxy resin (a) having an epoxy equivalent of from 150 g/eq to 200 g/eq and a hydroxyl equivalent of from 2,000 g/eq to 2, 600 g/eq in an amount of from 20 wt % to 40 wt % with respect to a total amount of the epoxy resin (a), a medium to high molecular weight polyol compound (b) having a number-average molecular weight of 200 or more, a polyisocyanate compound (c), and a low molecular weight polyol compound (d) having a number-average molecular weight of less than 200 serving as a chain extender, and causing the medium to high molecular weight polyol compound (b) and the polyisocyanate compound (c) to react with each other in a presence of the epoxy resin (a) while using the compounds in such amounts that a molar ratio between primary OH groups of the component (b) and NCO groups of the component (c) falls within a range of from 1:1.5 to 1:3; and then subjecting the urethane prepolymer (P) to a polyurethanation reaction by adding the low molecular weight polyol compound (d) so that a molar ratio between NCO groups of the urethane prepolymer (P) and OH groups of the low molecular weight polyol compound (d) may fall within a range of from 0.9:1 to 1:0.9.

According to another embodiment of the present invention, there is provided an epoxy resin composition, which is obtained by blending the above-mentioned polyurethane-modified epoxy resin with a polyurethane-unmodified epoxy resin (e), a curing agent (f), and a curing accelerator (g), in which the epoxy resin composition has a weight concentration (hereinafter referred to as polyurethane component concentration) of polyurethane constituent components (total of the polyol compound (b), the polyisocyanate compound (c), and the low molecular weight polyol compound (d)) of from 10 wt % to 30 wt %.

According to another embodiment of the present invention, there is provided an epoxy resin cured product, which is obtained by curing the above-mentioned epoxy resin composition.

The viscosity of a resin composition using the polyurethane-modified epoxy resin of the present invention before its curing can be suppressed to a range where processability is not impaired. In addition, both the rupture elongation and fracture toughness of a cured product of the composition can be improved, and a reduction in glass transition temperature thereof can be suppressed. Accordingly, the resin composition and the cured product are suitable for, for example, matrices for composite materials, adhesives, coating materials, and electrical and electronic materials.

DESCRIPTION OF EMBODIMENTS

A polyurethane-modified epoxy resin of the present invention may be produced by causing a medium to high molecular weight polyol compound (b), a polyisocyanate compound (c), and a low molecular weight polyol compound (d) to react with one another together with the epoxy resin (a).

A compound represented by any one of the following formulae (2) to (11) may be used as the medium to high molecular weight polyol compound (b), a compound represented by the following formula (12) may be used as the polyisocyanate compound (c), and a compound represented by the following formula (13) may be used as the low molecular weight polyol compound (d), in which one kind of the respective components (b), (c), and (d) may be used alone, or two or more kinds thereof may be used in combination:

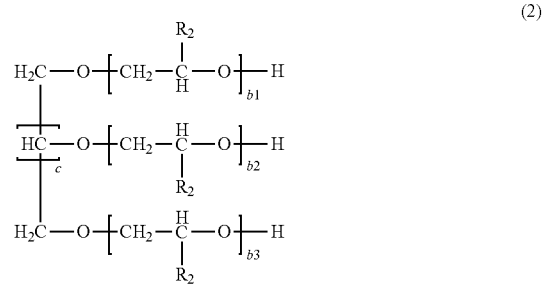

(2)

where b1, b2, and b3 each independently represent a number of from 1 to 50, and c represents a number of 0 or 1;

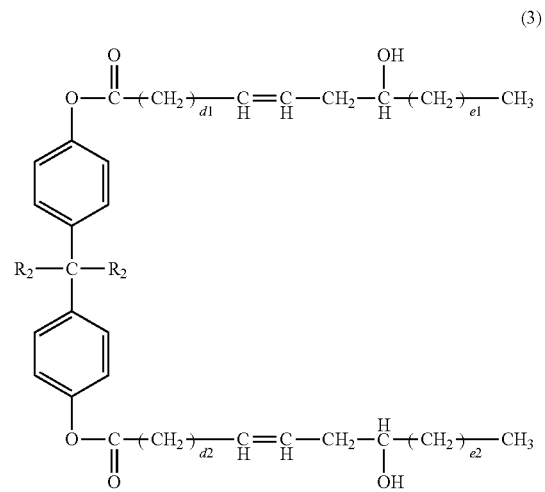

(3)

where $R_2$ represents H or a methyl group, and d1, d2, e1, and e2 each independently represent a number of from 1 to 20;

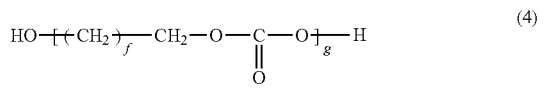
(4)

where f's each independently represent a number of from 1 to 20, and g represents a number of from 1 to 50;

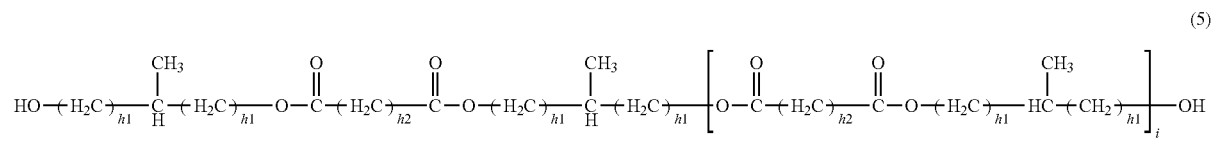
(5)

where h1 and h2 each independently represent a number of from 1 to 20, and i represents a number of from 1 to 50;

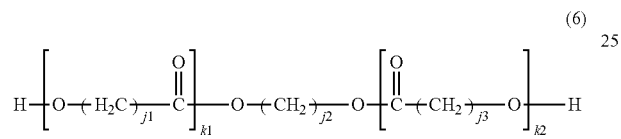
(6)

where j1, j2, and j3 each independently represent a number of from 1 to 20, and k1 and k2 each independently represent a number of from 1 to 50;

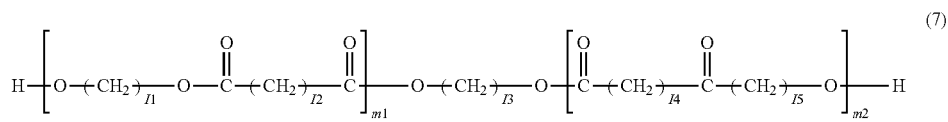
(7)

where l1, l2, l3, l4, and l5 each independently represent a number of from 1 to 20, and m1 and m2 each independently represent a number of from 1 to 50;

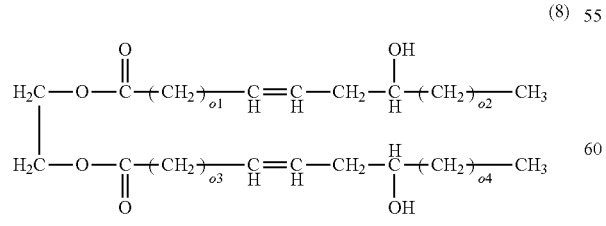
(8)

where o1, o2, o3, and o4 each independently represent a number of from 1 to 20;

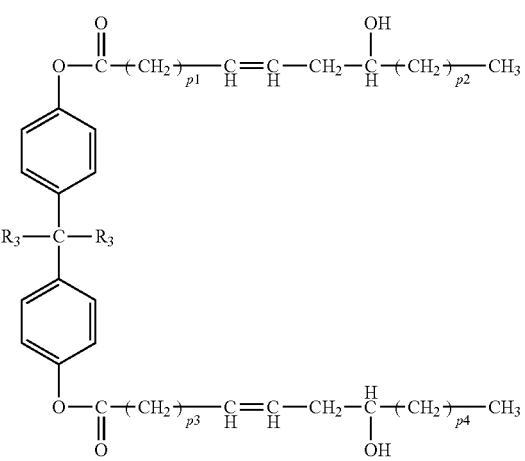
(9)

where $R_3$ represents H or a methyl group, and p1, p2, p3, and p4 each independently represent a number of from 1 to 20;

(10)
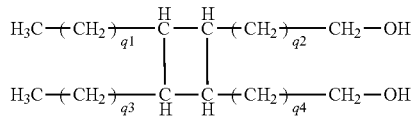

where q1, q2, q3, and q4 each independently represent a number of from 1 to 20;

(11)
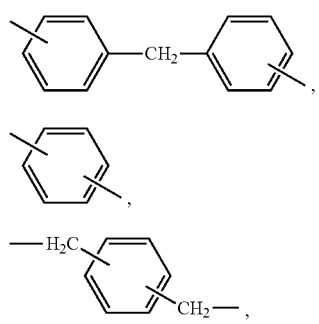

where r, s, and t each independently represent a number of from 1 to 20, and n represents a number of from 1 to 50;

(12)

OCN—R$_4$—NCO (12a)

(12b)
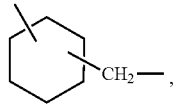

(12c)
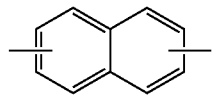

(12d)
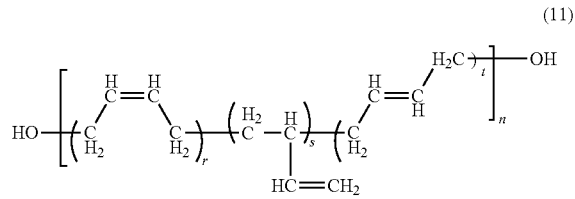

(12e)

(12f)

in the formula 12, R$_4$ represents a divalent group selected from the formulae 12a to 12f;

(13)
HO—R$_5$—OH (13a)
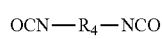

in the formula 13, R$_5$ represents an alkylene group represented by the formula 13a, and g represents a number of from 1 to 10.

It is particularly preferred that the epoxy resin (a) include a bisphenol A-type epoxy resin represented by the following formula (14) or a bisphenol F-type epoxy resin represented by the following formula (15), the medium to high molecular weight polyol compound (b) include a polypropylene glycol represented by the following formula (16), the low molecular weight polyol compound (d) include 1,4-butanediol represented by the following formula (17), and the polyisocyanate compound (c) include 4,4'-diphenylmethane diisocyanate represented by the following formula (18):

(14)
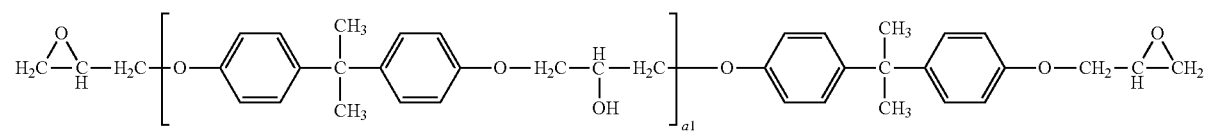

where a1 represents a number of from 0 to 10;

(15)
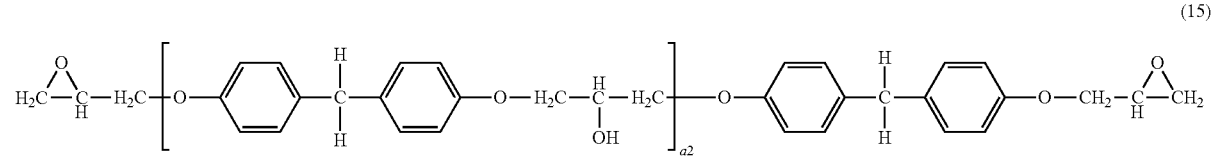

where a2 represents a number of from 0 to 10;

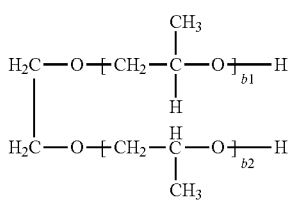
(16)

where b1 and b2 each independently represent a number of from 1 to 50.

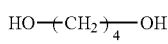
(17)

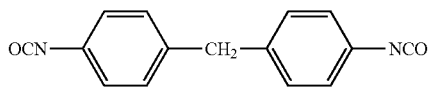
(18)

In the present invention, the epoxy resin (a) is a secondary hydroxyl group-containing bisphenol-based epoxy resin represented by the formula (1), and having an epoxy equivalent of from 150 g/eq to 200 g/eq and a hydroxyl equivalent of from 2,000 g/eq to 2,600 g/eq. In the formula (1), $R_1$ represents a hydrogen atom or a methyl group. The epoxy resin (a) is preferably the bisphenol A-type epoxy resin represented by the formula (14) or the bisphenol F-type epoxy resin represented by the formula (15).

In the formula, a represents a number of from 0 to 10. When the resin has a molecular weight distribution, the average (number average) of the a's only needs to satisfy the range. The a is defined so as to satisfy the epoxy equivalent and the hydroxyl equivalent.

The medium to high molecular weight polyol compound (b) has a number-average molecular weight of 200 or more, and has any one of the molecular structures represented by the formula (2) to the formula (11). The polyol compound (b) is preferably the polypropylene glycol represented by the formula (16).

The polyisocyanate compound (c) is represented by the formula (12). In the formula, $R_4$ represents a divalent group selected from the formulae (12a) to (12f). A preferred polyisocyanate compound is represented by the formula (17).

The low molecular weight polyol compound (d) is a polyol compound represented by the formula (13) and having a number-average molecular weight of less than 200. The compound is used as a chain extender. In the formula, $R_5$ represents an alkylene group represented by the formula (13a) and g represents a number (integer) of from 1 to 10.

A OH group in the epoxy resin (a) is a secondary OH group incorporated mainly into an epoxy resin having a polymerization degree of 1 (referred to as "n=1 body"). When the resin contains an epoxy resin having a polymerization degree of 2 or more (referred to as "n>1 body"), a secondary OH group is also incorporated into the epoxy resin, and the group is similarly treated. The n=1 body and the n>1 body are hereinafter collectively referred to as "n=1 or more bodies."

Meanwhile, a OH group of the polyol compound (b) is a primary OH group, and hence when the epoxy resin (a), the polyol compound (b), and the polyisocyanate compound (c) are loaded and caused to react with one another, a primary OH group of the polyol compound (b) and an NCO group of the polyisocyanate compound (c) preferentially react with each other.

When a molar ratio "(b):(c)" between the primary OH groups in the polyol compound (b) and the NCO groups in the polyisocyanate compound (c) is set to fall within the range of from 1:1.5 to 1:3, an NCO group-terminated urethane prepolymer (P1) is produced. After that, a secondary OH group of the n=1 or more bodies in the epoxy resin (a) reacts with part of the terminal NCO groups of the urethane prepolymer (P1) to form a urethane bond, and hence a urethane prepolymer (P2) in which the n=1 or more bodies in the epoxy resin (a) are added to each of both terminals, or one terminal, of the urethane prepolymer may be obtained.

That is, a urethane prepolymer (P) may be a mixture of the NCO group-terminated urethane prepolymer (P1) and the urethane prepolymer (P2) in which the n=1 or more bodies in the epoxy resin (a) are added to each of both terminals, or one terminal, of the P1.

As the loading ratio of the epoxy resin (a) is increased, both the terminals are each, or one of the terminals is, sealed with the n=1 or more bodies in the epoxy resin (a), and hence the terminal NCO groups are consumed. Then, the amount of the urethane prepolymer (P2) that does not react with the low molecular weight polyol compound (d) serving as a chain extender increases. In addition, the ratio of the original urethane prepolymer (P1) whose terminals are NCO groups reduces, and hence the production amount of a polyurethane produced by a reaction between a terminal NCO group of the P1 and a OH group of the low molecular weight polyol compound (d) serving as a chain extender reduces. Accordingly, the molecular weight distribution of the polyurethane-modified epoxy resin may shift to lower molecular weights.

In contrast, when the loading ratio of the epoxy resin (a) is reduced, the amount of the urethane prepolymer (P2) sealed with the n=1 or more bodies in the epoxy resin (a) at each of both terminals thereof or one terminal thereof reduces, and hence the ratio of the original urethane prepolymer (P1) still having NCO groups at terminals thereof increases. Accordingly, the production amount of the polyurethane produced by a reaction between a terminal NCO group of the P1 and a OH group of the low molecular weight polyol compound (d) serving as a chain extender increases, and hence the molecular weight distribution of the polyurethane-modified epoxy resin may shift to higher molecular weights.

The epoxy resin (a) is preferably liquid at normal temperature, and from such viewpoint, its epoxy equivalent is preferably 200 g/eq or less. The epoxy resin (a) is often a mixture of a monomer having a number n of repetitions of 0 and a multimer having a number n of repetitions of 1 or more, but when the resin contains a multimer, the resin has a secondary OH group produced by the ring-opening of an epoxy group. The OH group is reactive with an NCO group of the polyisocyanate compound (c) or a terminal NCO group of the urethane prepolymer (P), and hence the n=1 or more bodies in the epoxy resin (a) react therewith. An n=0 body free of any OH group is not involved in the reaction.

The polyol compound (b) and the polyisocyanate compound (c) are caused to react with each other while a loading ratio between the compounds is set so that the molar ratio "(b):(c)" between their OH groups and NCO groups may fall within the range of from 1:1.5 to 1:3. However, when both the polyol compound (b) and the polyisocyanate compound (c) are bifunctional, the molar ratio coincides with a molar ratio between the polyol compound (b) and the polyisocyanate compound (c). When the loading molar ratio between the (b) and the (c) is set so as to be rich in the (c) as described in the foregoing, a urethane prepolymer having isocyanate groups at both terminals thereof can be obtained. When the molar ratio is less than 1.5, as the molar ratio becomes closer to 1.0, the molecular weight of the urethane prepolymer to be produced excessively increases and hence its viscosity becomes excessively high. Meanwhile, the case where the molar ratio is more than 3 is not preferred because the molecular weight of the urethane prepolymer to be produced becomes excessively small, and hence there is a risk in that a modifying effect on, for example, plastic deformability in cured product characteristics cannot be sufficiently exhibited. When the molar ratio between the functional groups is shifted from 1 as described above, a low molecular weight urethane prepolymer is obtained.

The polyol compound (b) is preferably a compound having a number-average molecular weight of from 1,500 to 5,000 and excellent in compatibility with the epoxy resin (a). Examples thereof may include polyethylene glycols and polypropylene glycols each obtained by subjecting a polyhydric alcohol, such as ethylene glycol or glycerin, to ring-opening polyaddition with ethylene oxide or propylene oxide. Of those, a polypropylene glycol represented by the formula (2) is preferred in terms of ease of availability, and a satisfactory balance between a price and characteristics. In addition, the number of the OH groups of the polyol compound (b), which only needs to be 2 or more, is preferably 2.

The polypropylene glycol is preferably a polypropylene glycol having a number-average molecular weight of from 1,500 to 5,000, preferably from 2,000 to 3,000 from the following viewpoints: the polypropylene glycol does not thicken or semi-solidify a polyurethane-modified epoxy resin composition; and a satisfactory casting property of the composition, and satisfactory impregnability thereof into a carbon fiber or a glass fiber are secured.

The compound represented by the formula (12) is used as the polyisocyanate compound (c), and in the formula (12), $R_4$ represents a divalent group selected from the formulae (12a) to (12f). In addition, the compound is preferably a compound excellent in compatibility with the epoxy resin (a).

Examples thereof may include toluene diisocyanate (TDI), 4,4'-diphenylmethane diisocyanate (MDI), xylylene diisocyanate (XDI), hydrogenated xylylene diisocyanate (HXDI), isophorone diisocyanate (IPDI), and naphthalene diisocyanate. Of those, MDI represented by the formula (6) is preferred from the viewpoints of, for example, a low molecular weight, the absence of any thickening property, a low price, and a safety. The number of the NCO groups of the polyisocyanate compound (c), which only needs to be 2 or more, is preferably 2.

After the urethane prepolymer (P) has been obtained in the epoxy resin (a), the prepolymer is subjected to a polyurethanation reaction by loading the low molecular weight polyol compound (d) so that a molar ratio "(P):(d)" between the NCO groups in the urethane prepolymer (P) and the OH groups in the low molecular weight polyol compound (d) may fall within the range of from 0.9:1 to 1:0.9. Thus, the polyurethane-modified epoxy resin of the present invention can be obtained.

The low molecular weight polyol compound (d) has a number-average molecular weight of less than 200, and specific examples thereof include polyhydric alcohols, such as 1,4-butanediol and 1,6-pentanediol. The compound is preferably a diol having two OH groups, and is more preferably 1,4-butanediol in terms of ease of availability, and a satisfactory balance between a price and characteristics. The low molecular weight polyol compound (d) is represented by the formula (13). In the formula, $R_5$ represents an alkylene group represented by the formula (13a) and g represents a number of from 1 to 10.

The low molecular weight polyol compound (d) is desirably used in such an amount that the number of moles of the terminal NCO groups of the urethane prepolymer (P) and the number of moles of the OH groups of the low molecular weight polyol compound (d) are substantially equal to each other. That is, the polyol compound (b) and the low molecular weight polyol compound (d) have OH groups, and the polyisocyanate compound (c) has NCO groups, and hence the number of moles (B) of the OH groups of the (b) and the (d), and the number of moles (C) of the NCO groups of the (c) are preferably made substantially equal to each other. A ratio between the numbers preferably falls within the range of from 0.9:1 to 1:0.9. As the ratio between the number of moles of the OH groups and the number of moles of the NCO groups is made closer to 1, the molecular weight of the polyurethane to be produced increases.

In a production method of the present invention, the epoxy resin (a) is used in an amount of from 20 wt % to 60 wt % with respect to the total amount of the epoxy resin (a), the polyol compound (b) having a number-average molecular weight of 200 or more, the polyisocyanate compound (c), and the low molecular weight polyol compound (d) having a number-average molecular weight of less than 200 serving as a chain extender, and the polyol compound (b) and the polyisocyanate compound (c) are caused to react with each other in the presence of the epoxy resin (a) while the compounds are used in such amounts that the molar ratio "(b):(c)" between their OH groups and NCO groups falls within the range of from 1:1.5 to 1:3 (reaction 1). In the reaction 1, the reaction between the polyol compound (b) and the polyisocyanate compound (c) preferentially occurs to produce the urethane prepolymer (P1), and then a reaction between part of the urethane prepolymer (P1) and the epoxy resin (a) occurs to produce the urethane prepolymer (P2) epoxidized at both terminals thereof or one terminal thereof. Thus, a mixture of the prepolymer and the urethane prepolymer (P1) still having NCO groups at both terminals thereof is obtained.

The reaction (reaction 1) between the urethane prepolymer (P1) and the epoxy resin (a) is preferably performed at a reaction temperature in the range of from 80° C. to 150° C. for a reaction time in the range of from 1 hr to 5 hr because a low reactive secondary OH group of the n=1 or more bodies in the epoxy resin (a) needs to be caused to react with an NCO group to produce a urethane bond.

After that, the prepolymer is subjected to a polyurethanation reaction by adding the low molecular weight polyol compound (d) so that the molar ratio "(P):(d)" between the NCO groups in the urethane prepolymer (P) and the OH groups in the low molecular weight polyol compound (d) may fall within the range of from 0.9:1 to 1:0.9 (reaction 2). An epoxy group of the n=0 body of the epoxy resin and a OH group of the polyol compound (d) do not react with each other because the OH group of the polyol compound (d) is an alcoholic OH group.

In the course of the reactions (reactions 1 and 2), a catalyst may be used as required. The catalyst is used for the purpose of sufficiently completing the production of a urethane bond, and examples thereof may include amine compounds, such as ethylenediamine.

In the reaction 2, the urethane prepolymer (P1) having an NCO group at each of both terminals thereof or one terminal thereof reacts with the low molecular weight polyol compound (d), and hence the prepolymer is extended in chain length and polyurethanated. The urethane prepolymer (P2) having the n=1 or more bodies in the epoxy resin (a) added to each of both terminals thereof; and a urethane prepolymer (A') in which the epoxy resin serving as the n=1 body having a secondary hydroxyl group is added to each of both terminals thereof. In the epoxy resin (a), an epoxy resin serving as the n=0 body free of any secondary hydroxyl group is not involved in the reaction.

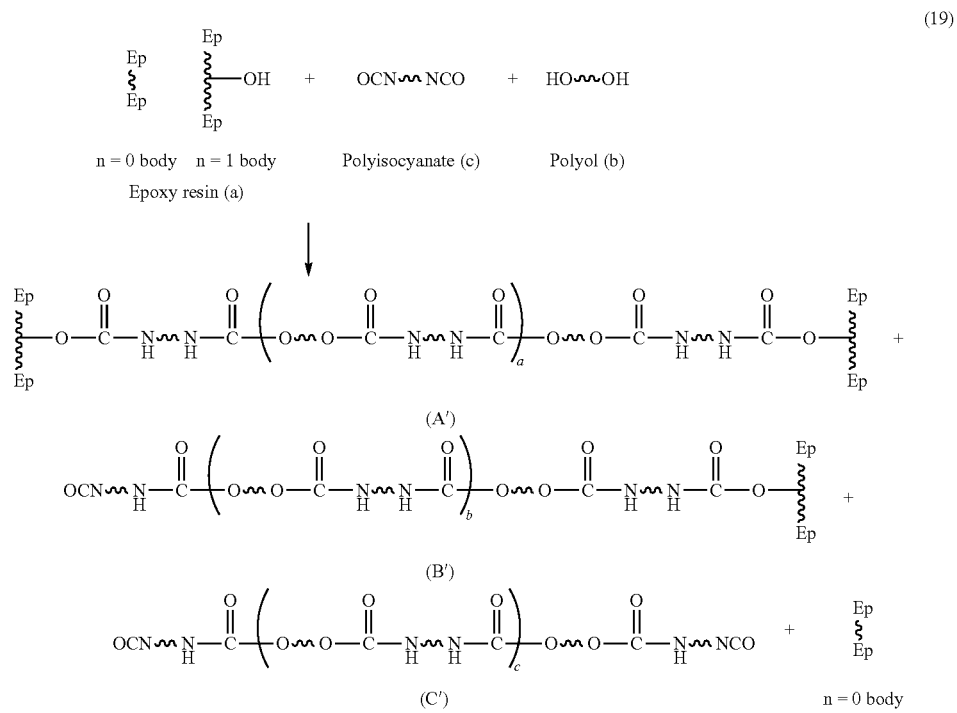

(19)

to each of both terminals thereof is present while remaining unreacted.

That is, the polyurethane-modified epoxy resin of the present invention is a mixture of a resin component having the n=1 or more bodies in the epoxy resin (a) added to each of both terminals of the urethane prepolymer (P), a resin component having the n=1 or more bodies in the epoxy resin (a) added to one terminal of the urethane prepolymer (P), and having an NCO group at the other terminal, a resin component having NCO groups at both terminals of the urethane prepolymer (P), and the n=0 body component in the epoxy resin (a), and preferably has an epoxy equivalent in the range of from 300 g/eq to 1,000 g/eq and a viscosity at 120° C. in the range of from 0.1 Pa·s to 20 Pa·s.

A reaction formula at the time of the obtainment of the polyurethane-modified epoxy resin of the present invention is described below.

The following formula 19 schematically describes a urethane prepolymer step serving as the reaction 1. The bisphenol-based epoxy resin (a) formed mainly of an n=0 body and an n=1 body, the medium to high molecular weight polyol compound (b), and the polyisocyanate compound (c) are caused to react with one another to produce the urethane prepolymer (P). The following three kinds are produced as the urethane prepolymer (P): a urethane prepolymer (C') having NCO groups at both terminals thereof; a urethane prepolymer (B') which has an NCO group at one terminal thereof and in which an epoxy resin serving as the n=1 body having a secondary hydroxyl group is added to the other The following formula 20 schematically describes a urethane polymer step (polyurethane step) serving as the reaction 2. When a reaction is performed by adding the low molecular weight polyol compound (d) to a mixture of the urethane prepolymer (C') having NCO groups at both terminals thereof, the urethane prepolymer (B') having an NCO group at one terminal thereof and having the epoxy resin serving as the n=1 body added to the other terminal thereof, and the urethane prepolymer (A') having the epoxy resin serving as the n=1 body added to each of both terminals thereof, the prepolymers being produced in the reaction 1, and the epoxy resin serving as the n=0 body that has not been involved in the reaction because of the absence of any secondary hydroxyl group, a low molecular weight polyurethane (A) mainly produced by a reaction between the urethane prepolymer (B') having the epoxy resin serving as the n=1 body added to one terminal thereof and the low molecular weight polyol compound (d), the polyurethane having the epoxy resin serving as the n=1 body added to each of both terminals thereof, a medium molecular weight polyurethane (B) mainly produced by a reaction among the urethane prepolymer (C') having NCO groups at both terminals thereof, the urethane prepolymer (B') having the epoxy resin serving as the n=1 body added to one terminal thereof, and the low molecular weight polyol compound (d), the polyurethane having the epoxy resin serving as the n=1 body added to only one terminal thereof, and a high molecular weight polyurethane (C) mainly produced by a reaction between the urethane prepolymer (C') having NCO groups at both terminals thereof and the low molecular weight polyol compound (d), the polyurethane being free from having the epoxy resin serving as the n=1 body added to each of both terminals thereof, are produced. The polyurethanes (A), (B), and (C) thus produced become a mixture with components not involved in the urethane polymer reaction, i.e., the urethane prepolymer (A') having the epoxy resin serving as the n=1 body added to each of both terminals thereof and the epoxy resin serving as the n=0 body.

The polyurethane-unmodified epoxy resin (e) is also preferably a bisphenol A-type epoxy resin or a bisphenol F-type epoxy resin that is liquid at normal temperature in terms of ease of availability, and a satisfactory balance between a price and characteristics.

A polyurethane concentration in a cured product of the polyurethane-modified epoxy resin composition may be increased or reduced by increasing or reducing the blending

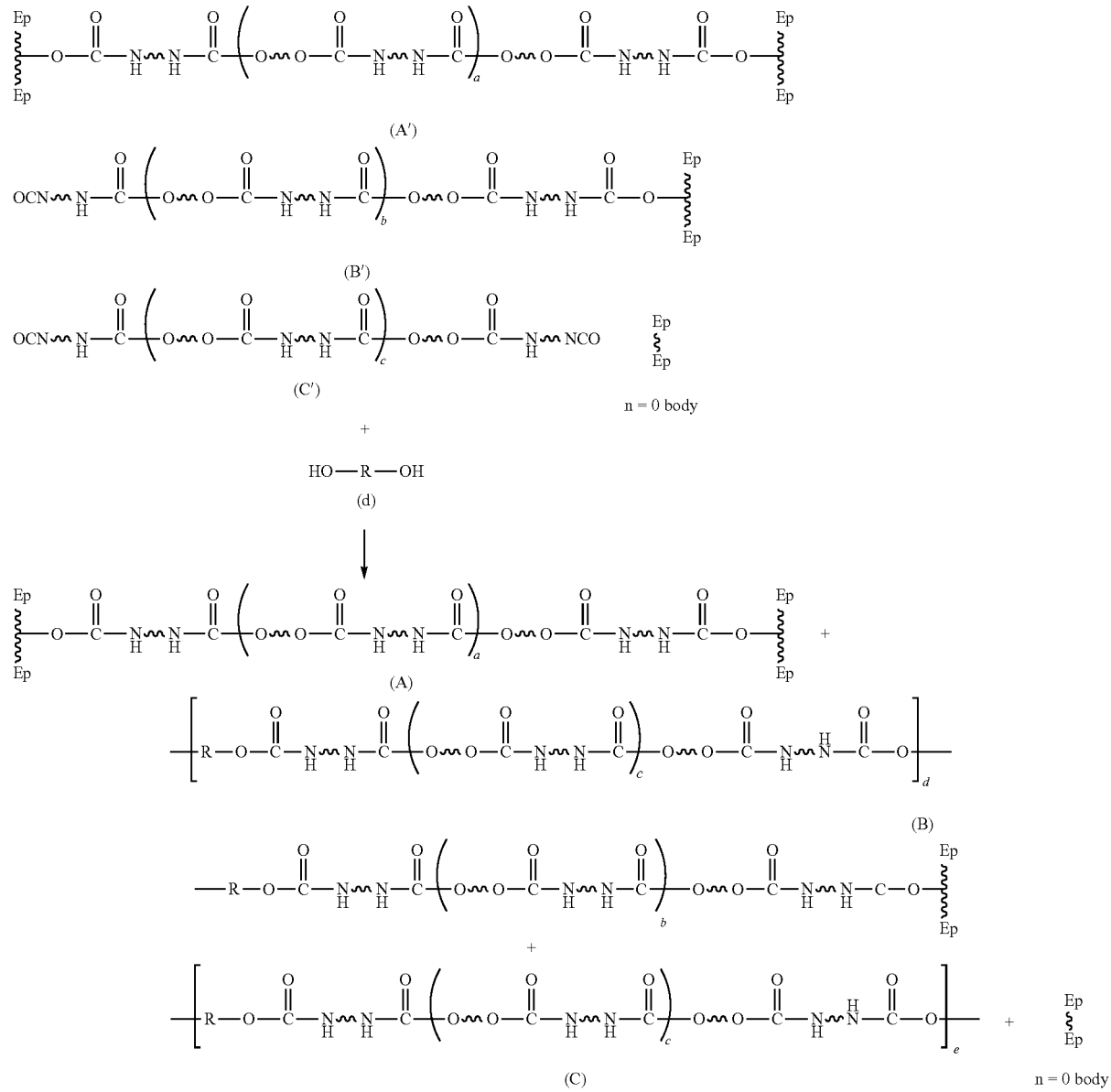

The polyurethane-modified epoxy resin composition of the present invention may be obtained by blending the polyurethane-modified epoxy resin with a polyurethane-unmodified epoxy resin (e) serving as an adjustor for a polyurethane concentration, a curing agent (f), and a curing accelerator (g). The resin composition may be blended with an inorganic filler, such as calcium carbonate, talc, or titanium dioxide, as an extending agent or a reinforcing material as required.

amount of the polyurethane-unmodified epoxy resin (e). Herein, the polyurethane concentration represents the wt % of the polyol compound (b), the polyisocyanate compound (c), and the low molecular weight polyol compound (d) serving as polyurethane constituent components in the cured product.

That is, the concentration is calculated from the following equation.

Polyurethane concentration=$\{(b)+(c)+(d)\}\times 100/\{(a)+(b)+(c)+(d)+(e)+(f)+(g)\}$ In the equation, the symbols (a) to (g) represent the used weights of the respective corresponding components.

As the polyurethane concentration in the cured product increases, cured product characteristics, such as a rupture elongation, a fracture toughness, and a glass transition temperature, vary. As the polyurethane concentration increases, the rupture elongation of the cured product tends to increase, the fracture toughness thereof tends to increase, and the glass transition temperature thereof tends to reduce.

When a liquid bisphenol A-type epoxy resin is used as the polyurethane-unmodified epoxy resin (e), the blending ratio of the bisphenol A-type epoxy resin in the composition is preferably set to from 5 wt % to 40 wt % so that a polyurethane modification ratio (=polyurethane concentration) in the cured product may fall within the range of from 10 wt % to 30 wt %. Thus, the cured product shows a rupture elongation of 5% or more, a fracture toughness of 1.1 MPa·m$^{0.5}$ or more, and a glass transition temperature of 120° C. or more, and hence excellent flexibility, excellent toughness, and excellent heat resistance can be achieved simultaneously.

When a liquid bisphenol F-type epoxy resin is used as the polyurethane-unmodified epoxy resin (e), the blending ratio of the bisphenol F-type epoxy resin in the composition is preferably set to from 1 wt % to 30 wt % so that a polyurethane modification ratio in the cured product may fall within the range of from 20 wt % to 30 wt %. Thus, the cured product shows a rupture elongation of 5% or more, a fracture toughness of 1.1 MPa·m$^{0.5}$ or more, and a glass transition temperature of 120° C. or more, and hence excellent flexibility, excellent toughness, and excellent heat resistance can be achieved simultaneously.

The curing agent (f) is preferably any one of various liquid carboxylic anhydrides, such as methyltetrahydrophthalic anhydride, and various liquid amine compounds similarly in terms of ease of availability, and a satisfactory balance between a price and characteristics.

A known curing agent for an epoxy resin may be used as the curing agent (f), but a liquid curing agent is preferred. For example, a carboxylic anhydride-based curing agent may be exemplified by phthalic anhydride, methyltetrahydrophthalic anhydride, hexahydrophthalic anhydride, methylhexahydrophthalic anhydride, and methylhimic acid. An amino-based curing agent may be exemplified by a polyalkylene polyamine, aminoethylpiperazine, meta-xylenediamine, isophoronediamine, and a polyoxyalkylenediamine, and a reaction product of any such amine with a monomer acid or a dimer acid, and a modified polyamine.

The blending amount of the curing agent (f) is preferably set as follows in terms of the cured product characteristics: when the curing agent is an acid anhydride, the blending amount is set so that a ratio between the number of moles of the epoxy groups of all epoxy resins including the polyurethane-modified epoxy resin and the polyurethane-unmodified epoxy resin (e), and the number of moles calculated by multiplying the number of moles of the acid anhydride group of the curing agent by 2 may fall within the range of from 1:1 to 1:1.2; and when the curing agent is an amine compound, the blending amount is set so that a ratio between the number of moles of the epoxy groups of all epoxy resins and the number of moles of active hydrogen of the curing agent may fall within the range of from 1:1 to 1:1.2.

An imidazole compound, such as 1-benzyl-2-methylimidazole, or the like may be used as the curing accelerator (g). The blending amount of the curing accelerator (g) preferably falls within the range of from 0.1 wt % to 5 wt % with respect to the total of all epoxy resins including the polyurethane-modified epoxy resin and the liquid polyurethane-unmodified epoxy resin (e), and the curing agent (f).

The polyurethane-modified epoxy resin composition of the present invention obtained as described above does not inhibit processability, such as a casting property into a mold, or impregnability into each of a carbon fiber and a glass fiber, and fabrics thereof.

The cured product of the polyurethane-modified epoxy resin composition of the present invention may be obtained by: heating the polyurethane-modified epoxy resin composition to a temperature of from 80° C. to 200° C. after the composition has been cast into a mold, after any one of a carbon fiber and a glass fiber, and fabrics thereof has been impregnated with the composition, after the composition has been applied and attached as an adhesive to an adherend, or after the composition has been applied as a coating to a product to be coated; and holding the composition at the temperature for several hours.

The cured product of the polyurethane-modified epoxy resin composition of the present invention thus obtained has a high rupture elongation property in a tensile test and high fracture toughness, specifically a rupture elongation of 5.0% or more and a fracture toughness value of 1.1 MPa·m$^{0.5}$ or more, and has a glass transition temperature as high as 120° C. or more.

EXAMPLES

Next, the present invention is specifically described on the basis of Examples. Example 1 to Example 5 and Reference Example 1 to Reference Example 4 relate to polyurethane-modified epoxy resins, and Example 6 to Example 10 and Comparative Example 1 to Comparative Example 4 relate to compositions and cured products thereof. The present invention is not limited by the specific examples, and various changes and modifications can be performed as long as the changes and modifications do not deviate from the gist of the present invention.

Methods of evaluating characteristics described in Examples are as described below.

(1) Viscosity: The viscosity of each of polyurethane-modified epoxy resins described in Examples and Comparative Examples below at 120° C. was measured with an ICI viscometer. In addition, the viscosity of each resin composition before its curing at 25° C. was measured with an E-type viscometer.

(2) Judgement of Presence or Absence of Remaining NCO Group through IR: 0.05 g of the resultant polyurethane-modified epoxy resin was dissolved in 10 ml of tetrahydrofuran. After that, the solution was applied onto a KBr plate with a micro-spatula flat plate portion, and was dried at room temperature for 15 minutes so that tetrahydrofuran was evaporated. Thus, a sample for IR measurement was prepared. The sample was set in a FT-IR apparatus "Spectrum-One" manufactured by PerkinElmer Co., Ltd., and when a stretching vibration absorption spectrum at 2,270 cm$^{-1}$ serving as the characteristic absorption band of an NCO group disappeared, it was judged that no remaining NCO group was present.

(3) Epoxy Equivalent: Determination was performed in accordance with JIS K 7236.

(4) Hydroxyl Equivalent: 25 ml of dimethylformamide was loaded into a 200-milliliter Erlenmeyer flask with a glass plug, and a sample containing 11 mg/eq or less of a hydroxyl group was precisely weighed and added to dimethylformamide to be dissolved therein. 20 ml of a 1 mol/l solution of phenyl isocyanate in toluene and 1 ml of a saturated solution of dibutyltin maleate were each added to the solution with a pipette, and the contents were shaken well to be mixed. The flask was tightly sealed and the mixture was subjected to a reaction for from 30 minutes to 60 minutes. After the completion of the reaction, 20 ml of a 2 mol/l solution of dibutylamine in toluene was added to the resultant, and the contents were shaken well to be mixed. The mixture was left to stand for 15 minutes and caused to react with excess phenyl isocyanate. Next, 30 ml of methyl cellosolve and 0.5 ml of a bromcresol green indicator were added to the resultant, and an excess amine was titrated with a 1 mol/l solution of perchloric acid in methyl cellosolve that had already been standardized. The color of the indicator changed from a blue color to a green color and then to a yellow color, and hence the first point at which the color became a yellow color was defined as an end point, and a hydroxyl equivalent was determined by using the following equation i and equation ii.

$$\text{Hydroxyl equivalent (g/eq)} = (1,000 \times W)/C(S-B) \qquad \text{(i)}$$

C: concentration of 1 mol/l solution of perchloric acid in methyl cellosolve in mol/l
W: amount of sample (g)
S: titration amount of 1 mol/l solution of perchloric acid in methyl cellosolve required for titration of a sample (ml)
B: titration amount of 1 mol/l solution of perchloric acid in methyl cellosolve required for blank test during titration (ml)

$$C = (1,000 \times W)/\{121 \times (s-b)\} \qquad \text{(ii)}$$

w: collection amount of tris-(hydroxymethyl)-aminomethane weighed for standardization (g)
s: titration amount of 1 mol/l solution of perchloric acid in methyl cellosolve required for titration of tris-(hydroxymethyl)-aminomethane (ml)
b: titration amount of 1 mol/l solution of perchloric acid in methyl cellosolve required for blank test during standardization (ml)

(5) Tensile Test: A cured product molded into the shape of JIS K 6911 by mold casting was used as a test piece, and its rupture elongation, rupture strength, and elastic modulus were each measured by performing a tensile test with a universal tester under a room temperature of 23° C. and under the condition of a crosshead speed of 5 mm/min.

(6) Fracture Toughness ($K_{1c}$): Measurement was performed in accordance with the bending method of ASTM E-399 under a room temperature of 23° C. at a crosshead speed of 0.5 mm/min.

(7) Dynamic Viscoelasticity (DMA): The temperature dispersion storage modulus (E') and temperature dispersion loss tangent (tan δ) of a cured product test piece molded into a rectangular parallelopiped shape measuring 4 mm by 10 mm by 50 mm by cast molding were measured with a dynamic viscoelasticity-measuring apparatus under the conditions of a frequency of 10 Hz and a rate of temperature increase of 2° C./min, and the E' at each of 40° C. and 180° C. was calculated. Simultaneously, the glass transition temperature (Tg) thereof was derived from the peak temperature of a tan δ curve.

The following raw materials were used.
Epoxy resin (a1): Epotohto YD-128 manufactured by Nippon Steel & Sumikin Chemical Co., Ltd., bisphenol A-type epoxy resin, epoxy equivalent: 186 g/eq, hydroxyl equivalent: 2,272 g/eq
Epoxy resin (a2): Epotohto YDF-170 manufactured by Nippon Steel & Sumikin Chemical Co., Ltd., bisphenol F-type epoxy resin, epoxy equivalent=170 (g/eq), hydroxyl equivalent=2,489 (g/eq)
Polyol (b); ADEKA POLYETHER P-2000 manufactured by ADEKA Corporation, polypropylene glycol, average molecular weight: 2,000, hydroxyl equivalent: 1,020 g/eq
Polyisocyanate (c); COSMONATE PH manufactured by Mitsui Chemicals, Inc., 4,4'-diphenylmethane diisocyanate
Low molecular weight polyol (d) compound; 1,4-butanediol (reagent)
Polyurethane-unmodified epoxy resin (e1): the same as epoxy resin (a1)
Polyurethane-unmodified epoxy resin (e2): the same as epoxy resin (a2)
Curing agent (f): HN-2200R manufactured by Hitachi Chemical Co., Ltd., methyltetrahydrophthalic anhydride
Curing accelerator (g): Curezol 1B2MZ manufactured by Shikoku Chemicals Corporation, 1-benzyl-2-methylimidazole Example 1

Synthesis of Polyurethane-Modified Bisphenol A-Type Epoxy Resin I 80.0 g of a bisphenol A-type epoxy resin "Epotohto YD-128" serving as the epoxy resin (a1) and 249.4 g of a polypropylene glycol "ADEKA POLYETHER P-2000" serving as the polyol compound (b) were each loaded into a 500-milliliter four-necked separable flask including a nitrogen-introducing tube, a stirring machine, and a temperature controller, and were stirred and mixed at room temperature for 15 minutes. Next, 61.1 g of 4,4'-diphenylmethane diisocyanate "COSMONATE PH" serving as the polyisocyanate compound (c) was loaded into the separable flask, and the mixture was subjected to a reaction at 120° C. for 2 hr (reaction 1: urethane prepolymer step). After that, 9.4 g of 1,4-butanediol serving as the low molecular weight polyol compound (d) that was a chain extender was loaded into the separable flask, and the mixture was subjected to a reaction at 120° C. for 2 hr (reaction 2: polyurethane step) to provide 400 g of a polyurethane-modified bisphenol A-type epoxy resin I. In this case, the epoxy resin (a1) was loaded so that its amount became 20 wt % with respect to 100 wt % of the product of the reaction 2. The completion of the reactions was confirmed by the disappearance of the absorption spectrum of an NCO group through IR measurement. The resultant polyurethane-modified bisphenol A-type epoxy resin I had an epoxy equivalent of 936 g/eq and a viscosity at 120° C. of 11.5 Pa·s.

Example 2

Synthesis of Polyurethane-Modified Bisphenol A-Type Epoxy Resin II 400 g of a polyurethane-modified bisphenol A-type epoxy resin II was obtained by performing reactions in accordance with the same procedure as that of Example 1 except that raw material loading composition was changed as shown in Table 1. In this case, the epoxy resin (a1) was loaded so that its amount became 40 wt % with respect to 100 wt % of the product of the reaction 2. The completion of the reactions was confirmed by the disappearance of the absorption spectrum of an NCO group through IR measurement. The resultant polyurethane-modified bisphenol A-type epoxy resin II had an epoxy equivalent of 464 g/eq and a viscosity at 120° C. of 2.64 Pa·s.

Reference Example 5

Synthesis of Polyurethane-Modified Bisphenol A-Type Epoxy Resin III 400 g of a polyurethane-modified bisphenol A-type epoxy resin III was obtained by performing reactions in accordance with the same procedure as that of Example 1 except that raw material loading composition was changed as shown in Table 1. In this case, the epoxy resin (a1) was loaded so that its amount became 60 wt % with respect to 100 wt % of the product of the reaction 2. The completion of the reactions was confirmed by the disappearance of the absorption spectrum of an NCO group through IR measurement. The resultant polyurethane-modified bisphenol A-type epoxy resin III had an epoxy equivalent of 312 g/eq and a viscosity at 120° C. of 0.45 Pa·s.

Example 4

Synthesis of Polyurethane-Modified Bisphenol F-Type Epoxy Resin I 400 g of a polyurethane-modified bisphenol F-type epoxy resin I was obtained by performing reactions in accordance with the same procedure as that of Example 1 except that raw material loading composition was changed as shown in Table 1. In this case, the epoxy resin (a2) was loaded so that its amount became 40 wt % with respect to 100 wt % of the product of the reaction 2. The completion of the reactions was confirmed by the disappearance of the absorption spectrum of an NCO group through IR measurement. The resultant polyurethane-modified bisphenol F-type epoxy resin I had an epoxy equivalent of 416 g/eq and a viscosity at 120° C. of 1.44 Pa·s.

Reference Example 6

Synthesis of Polyurethane-Modified Bisphenol F-Type Epoxy Resin II 400 g of a polyurethane-modified bisphenol F-type epoxy resin II was obtained by performing reactions in accordance with the same procedure as that of Example 1 except that raw material loading composition was changed as shown in Table 1. In this case, the epoxy resin (a2) was loaded so that its amount became 60 wt % with respect to 100 wt % of the product of the reaction 2. The completion of the reactions was confirmed by the disappearance of the absorption spectrum of an NCO group through IR measurement. The resultant polyurethane-modified bisphenol F-type epoxy resin II had an epoxy equivalent of 378 g/eq and a viscosity at 120° C. of 0.30 Pa·s.

Reference Example 1

Synthesis of Polyurethane-Modified Bisphenol A-Type Epoxy Resin IV 400 g of a polyurethane-modified bisphenol A-type epoxy resin IV was obtained by performing reactions in accordance with the same procedure as that of Example 1 except that raw material loading composition was changed as shown in Table 1. In this case, the epoxy resin (a1) was loaded so that its amount became 10 wt % with respect to 100 wt % of the product of the reaction 2. The completion of the reactions was confirmed by the disappearance of the absorption spectrum of an NCO group through IR measurement. The resultant polyurethane-modified bisphenol A-type epoxy resin IV had an epoxy equivalent of 1,870 g/eq and a viscosity at 120° C. of 32.8 Pa·s.

Reference Example 2

Synthesis of Polyurethane-Modified Bisphenol A-Type Epoxy Resin V 400 g of a polyurethane-modified bisphenol A-type epoxy resin V having an epoxy resin concentration of 64 wt. % was obtained by performing reactions in accordance with the same procedure as that of Example 1 except that raw material loading composition was changed as shown in Table 1. In this case, the epoxy resin (a1) was loaded so that its amount became 64 wt % with respect to 100 wt % of the product of the reaction 2. The completion of the reactions was confirmed by the disappearance of the absorption spectrum of an NCO group through IR measurement. The resultant polyurethane-modified bisphenol A-type epoxy resin V had an epoxy equivalent of 290 g/eq and a viscosity at 120° C. of 0.21 Pa·s.

Reference Example 3

Synthesis of Polyurethane-Modified Bisphenol F-Type Epoxy Resin III 400 g of a polyurethane-modified bisphenol F-type epoxy resin III was obtained by performing reactions in accordance with the same procedure as that of Example 1 except that raw material loading composition was changed as shown in Table 1. In this case, the epoxy resin (a2) was loaded so that its amount became 10 wt % with respect to 100 wt % of the product of the reaction 2. The completion of the reactions was confirmed by the disappearance of the absorption spectrum of an NCO group through IR measurement. The resultant polyurethane-modified bisphenol F-type epoxy resin III had an epoxy equivalent of 1,680 g/eq and a viscosity at 120° C. of 34.4 Pa·s.

Reference Example 4

Synthesis of Polyurethane-Modified Bisphenol F-Type Epoxy Resin IV 400 g of a polyurethane-modified bisphenol F-type epoxy resin IV having an epoxy resin concentration of 66 wt. % was obtained by performing reactions in accordance with the same procedure as that of Example 1 except that raw material loading composition was changed as shown in Table 1. In this case, the epoxy resin (a2) was loaded so that its amount became 66 wt % with respect to 100 wt % of the product of the reaction 2. The completion of the reactions was confirmed by the disappearance of the absorption spectrum of an NCO group through IR measurement. The resultant polyurethane-modified bisphenol F-type epoxy resin IV had an epoxy equivalent of 257 g/eq and a viscosity at 120° C. of 0.17 Pa·s.

TABLE 1

|  | Example 1 | Example 2 | Reference Example 5 | Example 4 | Reference Example 6 |
|---|---|---|---|---|---|
| Epoxy resin (a1) | 80.0 (20.0) | 160.0 (40.0) | 240.0 (60.0) | 0 (0) | 0 (0) |
| Epoxy resin (a2) | 0 (0) | 0 (0) | 0 (0) | 160.0 (40.0) | 240 (60.0) |
| Polyol compound (b) | 249.4 (62.4) | 188.6 (47.2) | 127.8 (32.0) | 188.4 (47.1) | 127.5 (31.9) |
| Polyisocyanate compound (c) | 61.1 (15.3) | 46.2 (11.6) | 31.3 (7.8) | 46.2 (11.5) | 31.2 (7.8) |
| Low molecular weight polyol compound (d) | 9.4 (2.4) | 5.2 (1.3) | 0.9 (0.2) | 5.4 (1.4) | 1.3 (0.3) |
| Total [g] (wt %) | 400 (100) | 400 (100) | 400 (100) | 400 (100) | 400 (100) |
| Concentration of epoxy resin (a) (wt %) | 20 | 40 | 60 | 40 | 60 |
| Remaining NCO group | None | None | None | None | None |

|  | Reference Example 1 | Reference Example 2 | Reference Example 3 | Reference Example 4 |
|---|---|---|---|---|
| Epoxy resin (a1) | 40.0 (10.0) | 256.6 (64.1) | 0 (0) | 0 (0) |
| Epoxy resin (a2) | 0 (0) | 0 (0) | 40.0 (10.0) | 264.9 (66.2) |
| Polyol compound (b) | 279.9 (70.0) | 115.2 (28.8) | 279.8 (70.0) | 108.5 (27.1) |
| Polyisocyanate compound (c) | 68.6 (17.2) | 28.2 (7.1) | 68.6 (17.1) | 26.6 (6.7) |
| Low molecular weight polyol compound (d) | 11.6 (2.9) | 0 (0) | 11.6 (2.9) | 0 (0) |
| Total [g] (wt %) | 400 (100) | 400 (100) | 400 (100) | 400 (100) |
| Concentration of epoxy resin (a) (wt %) | 10 | 64 | 10 | 66 |
| Remaining NCO group | None | None | None | None |

(Remark)
In the table, a numerical value in parentheses ( ) represents a wt %.

Next, Examples of epoxy resin compositions and epoxy resin cured products using the polyurethane-modified epoxy resins of Examples 1 to 5 and Reference Examples described above are described. Simultaneously, their results are collectively shown in Table 2.

Example 6

26.0 g of the polyurethane-modified bisphenol A-type epoxy resin I obtained in Example 1 serving as a polyurethane-modified epoxy resin, 52.3 g of Epotohto YD-128 serving as the polyurethane-unmodified epoxy resin (e), 51.0 g of HN-2200R serving as the curing agent (f), and 0.7 g of 1B2MZ serving as the curing accelerator (g) were each loaded into a 500-milliliter disposable cup, and were stirred and mixed well with a stainless-steel spatula to provide a liquid resin composition. In this case, a molar ratio between an epoxy group and a carboxylic anhydride group was set to 1:1, and 130 g of a polyurethane-modified bisphenol A-type epoxy resin composition having a polyurethane concentration in a cured product thereof of 10 wt % was prepared. The composition thus blended and prepared was then heated in a hot air oven at 80° C. for 15 minutes in order for the escape of bubbles to be promoted. After that, the composition was loaded into a vacuum desiccator and subjected to vacuum defoaming for 1.5 hr. The resultant liquid resin composition that had already been subjected to the defoaming operation had a viscosity at 25° C. of 34 Pa·s.

Next, the liquid resin composition that had already been defoamed was cast into each of: a mold having 5 groove shapes each having the dimensions of a test piece for a tensile test of JIS K 6911; and molds for a fracture toughness test and for a DMA test each having 6 groove shapes each measuring 100 mm long by 4 mm wide by 5 mm high. A casting property at this time was at such a level that the composition was able to be sufficiently cast with a margin. Next, a mold having cast thereinto the resin was loaded into a hot air oven, and was thermally cured at 80° C. for 2 hr and then at 100° C. for 3 hr to prepare an epoxy resin cured product test piece. The test piece was subjected to a tensile test and a fracture toughness test under the conditions described in the foregoing. As a result, the test piece had a rupture elongation of 7.0% and a fracture toughness of 1.80 MPa·m$^{0.5}$, and hence the cured product was extremely useful as, for example, a resin for a leading-edge composite material required to have a high fatigue resistance characteristic. In addition, the glass transition temperature of the cured product by the DMA measurement was 126° C., and hence the cured product simultaneously achieved a rupture elongation as high as 5% or more, a fracture toughness as high as 1.1 MPa·m$^{0.5}$ or more, and high heat resistance, specifically a glass transition temperature of 110° C. or more.

Example 7

130 g of a polyurethane-modified bisphenol A-type epoxy resin composition having a polyurethane concentration in a cured product thereof of 20 wt % was prepared in accordance with the same procedure as that of Example 6 except that the polyurethane-modified bisphenol A-type epoxy resin II obtained in Example 2 serving as a polyurethane-modified epoxy resin, the polyurethane-unmodified epoxy resin (e), the curing agent (f), and the curing accelerator (g) were used according to blending composition shown in Table 2. Next, a defoamed liquid resin composition was obtained by performing a defoaming operation in accordance with the same procedure as that of Example 6. The liquid resin composition that had already been subjected to the defoaming operation had a viscosity at 25° C. of 54 Pa·s. Next, in accordance with the same procedure as that of Example 6, the defoamed liquid resin composition was cast into a mold and thermally cured to prepare a test piece for a characteristic evaluation. Next, a tensile test, DMA measurement, and a fracture toughness test were performed under the same conditions as those of Example 6. As a result, the test piece had a rupture elongation of 11.2% and a fracture toughness of 1.62 MPa·m$^{0.5}$, and hence the cured product was also extremely useful as, for example, a resin for a leading-edge composite material required to have a high fatigue resistance characteristic. In addition, the glass transition temperature of the cured product by the DMA measurement was 123° C., and hence the cured product simultaneously achieved a rupture elongation as high as 5% or more, a fracture toughness as high as 1.1 MPa·m$^{0.5}$ or more, and high heat resistance, specifically a glass transition temperature of 110° C. or more.

Example 8

130 g of a polyurethane-modified bisphenol A-type epoxy resin composition having a polyurethane concentration in a cured product thereof of 30 wt % was prepared in accordance with the same procedure as that of Example 6 except that the polyurethane-modified bisphenol A-type epoxy resin III obtained in Example 3 serving as a polyurethane-modified epoxy resin, the polyurethane-unmodified epoxy resin (e), the curing agent (f), and the curing accelerator (g) were used according to blending composition shown in Table 2. Next, a defoamed liquid resin composition was obtained by performing a defoaming operation in accordance with the same procedure as that of Example 6. The liquid resin composition that had already been subjected to the defoaming operation had a viscosity at 25° C. of 54 Pa·s. Next, in accordance with the same procedure as that of Example 6, the defoamed liquid resin composition was cast into a mold and thermally cured to prepare a test piece for a characteristic evaluation. Next, a tensile test, DMA measurement, and a fracture toughness test were performed under the same conditions as those of Example 6. As a result, the test piece had a rupture elongation of 6.5% and a fracture toughness of 1.26 MPa·m$^{0.5}$, and hence the cured product was also extremely useful as, for example, a resin for a leading-edge composite material required to have a high fatigue resistance characteristic. In addition, the glass transition temperature of the cured product by the DMA measurement was 120° C., and hence the cured product simultaneously achieved a rupture elongation as high as 5% or more, a fracture toughness as high as 1.1 MPa·m$^{0.5}$ or more, and high heat resistance, specifically a glass transition temperature of 110° C. or more.

Example 9

130 g of a polyurethane-modified bisphenol F-type epoxy resin composition having a polyurethane concentration in a cured product thereof of 20 wt % was prepared in accordance with the same procedure as that of Example 6 except that the polyurethane-modified bisphenol F-type epoxy resin I obtained in Example 4 serving as a polyurethane-modified epoxy resin, an epoxy resin (for dilution), an acid anhydride (the curing agent), and imidazole (the curing accelerator) were used according to blending composition shown in Table 2. Next, a defoamed liquid resin composition was obtained by performing a defoaming operation in accordance with the same procedure as that of Example 6. The liquid resin composition that had already been subjected to the defoaming operation had a viscosity at 25° C. of 18 Pa·s. Next, in accordance with the same procedure as that of Example 6, the defoamed liquid resin composition was cast into a mold and thermally cured to prepare a test piece for a characteristic evaluation. Next, a tensile test, DMA measurement, and a fracture toughness test were performed under the same conditions as those of Example 6. As a result, the test piece had a rupture elongation of 8.9% and a fracture toughness of 1.39 MPa·s$^{0.5}$, and hence the cured product was also extremely useful as, for example, a resin for a leading-edge composite material required to have a high fatigue resistance characteristic. In addition, the glass transition temperature of the cured product by the DMA measurement was 120° C., and hence the cured product simultaneously achieved a rupture elongation as high as 5% or more, a fracture toughness as high as 1.1 MPa·m$^{0.5}$ or more, and high heat resistance, specifically a glass transition temperature of 110° C. or more.

Example 10

130 g of a polyurethane-modified bisphenol F-type epoxy resin composition having a polyurethane concentration in a cured product thereof of 30 wt % was prepared in accordance with the same procedure as that of Example 6 except that the polyurethane-modified bisphenol F-type epoxy resin II obtained in Example 5 serving as a polyurethane-modified epoxy resin, an epoxy resin (for dilution), an acid anhydride (the curing agent), and imidazole (the curing accelerator) were used according to blending composition shown in Table 2. Next, a defoamed liquid resin composition was obtained by performing a defoaming operation in accordance with the same procedure as that of Example 6. The liquid resin composition that had already been subjected to the defoaming operation had a viscosity at 25° C. of 12 Pa·s. Next, in accordance with the same procedure as that of Example 6, the defoamed liquid resin composition was cast into a mold and thermally cured to prepare a test piece for a characteristic evaluation. Next, a tensile test, DMA measurement, and a fracture toughness test were performed under the same conditions as those of Example 6. As a result, the test piece had a rupture elongation of 5.2% and a fracture toughness of 1.20 MPa·m$^{0.5}$, and hence the cured product was also extremely useful as, for example, a resin for a leading-edge composite material required to have a high fatigue resistance characteristic. In addition, the glass transition temperature of the cured product by the DMA measurement was 120° C., and hence the cured product simultaneously achieved a rupture elongation as high as 5% or more, a fracture toughness as high as 1.1 MPa·m$^{0.5}$ or more, and high heat resistance, specifically a glass transition temperature of 110° C. or more.

Comparative Example 1

130 g of a polyurethane-modified bisphenol A-type epoxy resin composition having a polyurethane concentration in a cured product thereof of 5 wt % was prepared in accordance with the same procedure as that of Example 6 except that the polyurethane-modified bisphenol A-type epoxy resin IV obtained in Reference Example 1 serving as a polyurethane-modified epoxy resin, an epoxy resin (for dilution), an acid anhydride (the curing agent), and imidazole (the curing accelerator) were used according to blending composition shown in Table 2. Next, a defoamed liquid resin composition was obtained by performing a defoaming operation in accordance with the same procedure as that of Example 6. The liquid resin composition that had already been subjected to the defoaming operation had a viscosity at 25° C. of 12 Pa·s. Next, in accordance with the same procedure as that of Example 6, the defoamed liquid resin composition was cast into a mold and thermally cured to prepare a test piece for a characteristic evaluation. Next, a tensile test, DMA measurement, and a fracture toughness test were performed under the same conditions as those of Example 6. As a result, the test piece had a rupture elongation of 2.4%, a fracture toughness of 1.20 MPa·s$^{0.5}$, and a glass transition temperature of 129° C. Although the test piece showed a fracture toughness as high as 1.1 MPa·m$^{0.5}$ or more and high heat resistance, specifically a glass transition temperature of 110° C. or more, the rupture elongation was 5% or less, and hence the three characteristics could not be achieved simultaneously.

Comparative Example 2

130 g of a polyurethane-modified bisphenol A-type epoxy resin composition having a polyurethane concentration in a cured product thereof of 32 wt % was prepared in accordance with the same procedure as that of Example 6 except that the polyurethane-modified bisphenol A-type epoxy resin V obtained in Reference Example 2 serving as a polyurethane-modified epoxy resin, an epoxy resin (for dilution), an acid anhydride (the curing agent), and imidazole (the curing accelerator) were used according to blending composition shown in Table 2. Next, a defoamed liquid resin composition was obtained by performing a defoaming operation in accordance with the same procedure as that of Example 6. The liquid resin composition that had already been subjected to the defoaming operation had a viscosity at 25° C. of 21 Pa·s. Next, in accordance with the same procedure as that of Example 6, the defoamed liquid resin composition was cast into a mold and thermally cured to prepare a test piece for a characteristic evaluation. Next, a tensile test, DMA measurement, and a fracture toughness test were performed under the same conditions as those of Example 6. As a result, the test piece had a rupture elongation of 4.3%, a fracture toughness of 1.10 MPa·m$^{0.5}$, and a glass transition temperature of 111° C. Although the test piece showed a fracture toughness as high as 1.1 MPa·m$^{0.5}$ or more and high heat resistance, specifically a glass transition temperature of 110° C. or more, the rupture elongation was 5% or less, and hence the three characteristics could not be achieved simultaneously.

Comparative Example 3

130 g of a polyurethane-modified bisphenol F-type epoxy resin composition having a polyurethane concentration in a cured product thereof of 5 wt % was prepared in accordance with the same procedure as that of Example 6 except that the polyurethane-modified bisphenol F-type epoxy resin III obtained in Reference Example 3 serving as a polyurethane-modified epoxy resin, an epoxy resin (for dilution), an acid anhydride (the curing agent), and imidazole (the curing accelerator) were used according to blending composition shown in Table 2. Next, a defoamed liquid resin composition was obtained by performing a defoaming operation in accordance with the same procedure as that of Example 6. The liquid resin composition that had already been subjected to the defoaming operation had a viscosity at 25° C. of 3 Pa·s. Next, in accordance with the same procedure as that of Example 6, the defoamed liquid resin composition was cast into a mold and thermally cured to prepare a test piece for a characteristic evaluation. Next, a tensile test, DMA measurement, and a fracture toughness test were performed under the same conditions as those of Example 6. As a result, the test piece had a rupture elongation of 1.1%, a fracture toughness of 0.52 MPa·m$^{0.5}$, and a glass transition temperature of 125° C. Although the test piece showed high heat resistance, specifically a glass transition temperature of 110° C. or more, the test piece could not show a fracture toughness as high as 1.1 MPa·m$^{0.5}$ or more and a rupture elongation of 5% or more.

Comparative Example 4

130 g of a polyurethane-modified bisphenol F-type epoxy resin composition having a polyurethane concentration in a cured product thereof of 5 wt % was prepared in accordance with the same procedure as that of Example 6 except that the polyurethane-modified bisphenol F-type epoxy resin IV obtained in Reference Example 4 serving as a polyurethane-modified epoxy resin, an epoxy resin (for dilution), an acid anhydride (the curing agent), and imidazole (the curing accelerator) were used according to blending composition shown in Table 2. Next, a defoamed liquid resin composition was obtained by performing a defoaming operation in accordance with the same procedure as that of Example 6. The liquid resin composition that had already been subjected to the defoaming operation had a viscosity at 25° C. of 7 Pa·s. Next, in accordance with the same procedure as that of Example 6, the defoamed liquid resin composition was cast into a mold and thermally cured to prepare a test piece for a characteristic evaluation. Next, a tensile test, DMA measurement, and a fracture toughness test were performed under the same conditions as those of Example 6. As a result, the test piece had a rupture elongation of 4.6%, a fracture toughness of 1.11 MPa·m$^{0.5}$, and a glass transition temperature of 106° C. Although the test piece showed a fracture toughness as high as 1.1 MPa·m$^{0.5}$ or more, the test piece could not show a rupture elongation of 5% or more and a glass transition temperature of 110° C. or more.

TABLE 2

| | | | Example 6 | Example 7 | Reference Example 7 | Example 9 | Reference Example 8 |
|---|---|---|---|---|---|---|---|
| Composition | Polyurethane-modified epoxy resin | Example 1 (BPA-type) | 26.0 (20.0) | 0 (0) | 0 (0) | 0 (0) | 0 (0) |
| | | Example 2 (BPA-type) | 0 (0) | 52.0 (40.0) | 0 (0) | 0 (0) | 0 (0) |

TABLE 2-continued

|  |  |  |  |  |  |  |  |
|---|---|---|---|---|---|---|---|
|  |  | Reference Example 5 (BPA-type) | 0 (0) | 0 (0) | 78.0 (60.0) | 0 (0) | 0 (0) |
|  |  | Example 4 (BPF-type) | 0 (0) | 0 (0) | 0 (0) | 52.0 (40.0) | 0 (0) |
|  |  | Reference Example 6 (BPF-type) | 0 (0) | 0 (0) | 0 (0) | 0 (0) | 78.0 (60.0) |
|  |  | Reference Example 1 (BPA-type) | 0 (0) | 0 (0) | 0 (0) | 0 (0) | 0 (0) |
|  |  | Reference Example 2 (BPA-type) | 0 (0) | 0 (0) | 0 (0) | 0 (0) | 0 (0) |
|  |  | Reference Example 3 (BPF-type) | 0 (0) | 0 (0) | 0 (0) | 0 (0) | 0 (0) |
|  |  | Reference Example 4 (BPF-type) | 0 (0) | 0 (0) | 0 (0) | 0 (0) | 0 (0) |
|  | Polyurethane-unmodified epoxy resin (e) | BPA-type | 52.3 (40.2) | 31.1 (24.0) | 5.2 (4.0) | 0 (0) | 0 (0) |
|  |  | BPF-type | 0 (0) | 0 (0) | 0 (0) | 28.6 (22.0) | 2.4 (1.9) |
|  | Curing agent (f) |  | 51.0 (39.3) | 46.2 (35.5) | 46.1 (35.5) | 48.7 (37.5) | 48.9 (37.6) |
|  | Curing accelerator (g) |  | 0.7 (0.5) | 0.7 (0.5) | 3.7 (3.5) | 0.7 (0.5) | 0.7 (0.5) |
|  | Total (g) [(wt %)] |  | 130 (100) | 130 (100) | 130 (100) | 130 (100) | 130 (100) |
|  | Polyurethane component concentration (wt %) |  | 16 | 24 | 24 | 24 | 24 |
| Viscosity of composition (Pa · s) |  |  | 34 | 54 | 24 | 18 | 12 |
| Cured product characteristic | Rupture elongation (%) |  | 7.0 | 11.2 | 6.5 | 8.9 | 5.2 |
|  | Elastic modulus (GPa) |  | 2.2 | 1.6 | 1.7 | 1.5 | 1.6 |
|  | Rupture strength (MPa) |  | 45.1 | 37.8 | 41.4 | 37.2 | 37.8 |
|  | Tg (° C.) |  | 126 | 123 | 120 | 120 | 111 |
|  | Storage modulus E' | Measurement at 40° C. (GPa) | 1.1 | 0.8 | 0.9 | 0.7 | 1.1 |
|  |  | Measurement at 170° C. (MPa) | 17.8 | 13.2 | 11.7 | 15.0 | 14.8 |
|  | Fracture toughness $K_{IC}$ (MPa · m$^{0.5}$) |  | 1.80 | 1.62 | 1.26 | 1.39 | 1.20 |

|  |  |  | Reference Example 1 | Reference Example 2 | Reference Example 3 | Reference Example 4 |
|---|---|---|---|---|---|---|
| Composition | Polyurethane-modified epoxy resin | Example 1 (BPA-type) | 0 (0) | 0 (0) | 0 (0) | 0 (0) |
|  |  | Example 2 (BPA-type) | 0 (0) | 0 (0) | 0 (0) | 0 (0) |
|  |  | Reference Example 5 (BPA-type) | 0 (0) | 0 (0) | 0 (0) | 0 (0) |
|  |  | Example 4 (BPF-type) | 0 (0) | 0 (0) | 0 (0) | 0 (0) |
|  |  | Reference Example 6 (BPF-type) | 0 (0) | 0 (0) | 0 (0) | 0 (0) |
|  |  | Reference Example 1 (BPA-type) | 13.0 (10.0) | 0 (0) | 0 (0) | 0 (0) |
|  |  | Reference Example 2 (BPA-type) | 0 (0) | 82.3 (63.3) | 0 (0) | 0 (0) |
|  |  | Reference Example 3 (BPF-type) | 0 (0) | 0 (0) | 13.0 (10.0) | 0 (0) |
|  |  | Reference Example 4 (BPF-type) | 0 (0) | 0 (0) | 0 (0) | 78.6 (60.5) |
|  | Polyurethane-unmodified epoxy resin (e) | BPA-type | 55.3 (42.6) | 0 (0) | 0 (0) | 0 (0) |
|  |  | BPF-type | 0 (0) | 0 (0) | 58.2 (44.8) | 0 (0) |
|  | Curing agent (f) |  | 55.3 (42.6) | 47.1 (36.2) | 58.1 (44.7) | 50.8 (39.0) |
|  | Curing accelerator (g) |  | 3.7 (3.5) | 0.7 (0.5) | 3.7 (3.5) | 0.7 (0.5) |
|  | Total (g) [(wt %)] |  | 130 (100) | 130 (100) | 130 (100) | 130 (100) |
|  | Polyurethane component concentration (wt %) |  | 9 | 22.8 | 9 | 20.6 |
| Viscosity of composition (Pa · s) |  |  | 12 | 21 | 3 | 7 |
| Cured product characteristic | Rupture elongation (%) |  | 2.4 | 4.3 | 1.1 | 4.6 |
|  | Elastic modulus (GPa) |  | 3.1 | 1.2 | 3.2 | 0.8 |

TABLE 2-continued

| | | | | | |
|---|---|---|---|---|---|
| Rupture strength (MPa) | | 44.6 | 39.5 | 42.4 | 37.3 |
| Tg (° C.) | | 129 | 111 | 125 | 106 |
| Storage modulus E' | Measurement at 40° C. (GPa) | 1.3 | 0.8 | 1.2 | 0.7 |
| | Measurement at 170° C. (MPa) | 31.6 | 10.4 | 28.6 | 9.5 |
| Fracture toughness $K_{1C}$ (MPa · m$^{0.5}$) | | 1.20 | 1.10 | 0.52 | 1.11 |

(Remark)
In the table, a numerical value in parentheses ( ) represents a wt %.

INDUSTRIAL APPLICABILITY

The resin composition and cured product of the polyurethane-modified epoxy resin of the present invention can be suitably utilized in various applications, such as matrices for composite materials, adhesives, coating materials, and electrical and electronic materials.

The invention claimed is:

1. A polyurethane-modified epoxy resin, which is obtained by modifying a bisphenol-based epoxy resin (a) comprising a diglycidyl ether of bisphenol A or bisphenol F having an epoxy equivalent of from 150 g/eq to 200 g/eq and a hydroxyl equivalent of from 2,000 g/eq to 2,600 g/eq with a medium to high molecular weight polyol compound (b) having a number-average molecular weight of 200 or more, a polyisocyanate compound (c), and a low molecular weight polyol compound (d) having a number-average molecular weight of less than 200 serving as a chain extender, the polyurethane-modified epoxy resin comprising a polyurethane having functional groups derived from the epoxy resin (a) covalently bonded to each of both terminals thereof and/or one terminal thereof, the polyurethane being obtained by:

producing a urethane prepolymer (P) by causing the medium to high molecular weight polyol compound (b) and the polyisocyanate (c) to react with each other in a presence of the epoxy resin (a), wherein the epoxy resin (a) is reacted in an amount of from 20 wt % to 40 wt % with respect to a total amount of (a), (b), (c), and (d), and the components (b) and (c) are reacted in an amount such that a molar ratio between primary OH groups of the component (b) and NCO groups of the component (c) falls within a range of from 1:1.5 to 1.3; and then subjecting the urethane prepolymer (P) to a polyurethanation reaction by adding the low molecular weight polyol compound (d) so that a molar ratio between NCO groups of the urethane prepolymer (P) and OH groups of the low molecular weight polyol compound (d) falls within a range of from 0.9:1 to 1:0.9.

2. A polyurethane-modified epoxy resin according to claim 1, wherein the medium to high molecular weight polyol compound (b) comprises a compound represented by any one of the following formulae (2), (4) to (7), (10), and (11), the polyisocyanate compound (c) comprises a compound represented by the following formula (12), and the low molecular weight polyol compound (d) comprises a compound represented by the following formula (13):

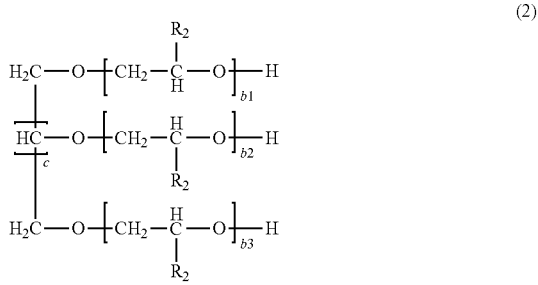
(2)

where $R_2$ represents H or a methyl group, b1, b2, and b3 each independently represent a number of from 1 to 50, and c represents a number of 0 or 1;

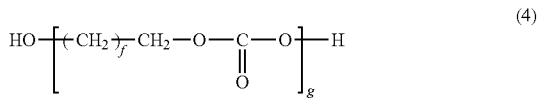
(4)

where f's each independently represent a number of from 1 to 20, and g represents a number of from 1 to 50;

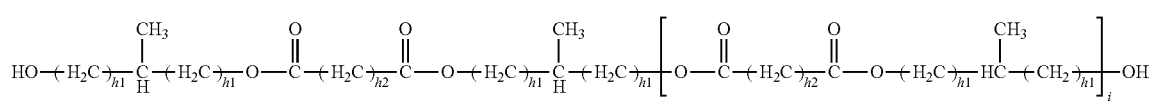
(5)

where h1 and h2 each independently represent a number of from 1 to 20, and i represents a number of from 1 to 50;

(6)
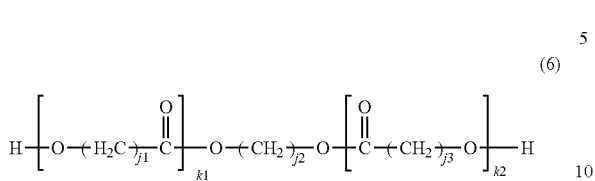

where j1, j2, and j3 each independently represent a number of from 1 to 20, and k1 and k2 each independently represent a number of from 1 to 50;

(7)
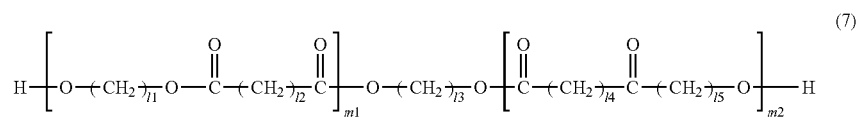

where l1, l2, l3, l4, and l5 each independently represent a number of from 1 to 20, and m1 and m2 each independently represent a number of from 1 to 50;

(10)
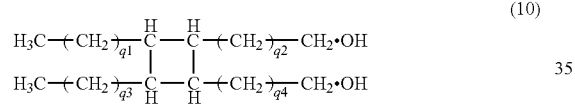

where q1, q2, q3, and q4 each independently represent a number of from 1 to 20;

(11)
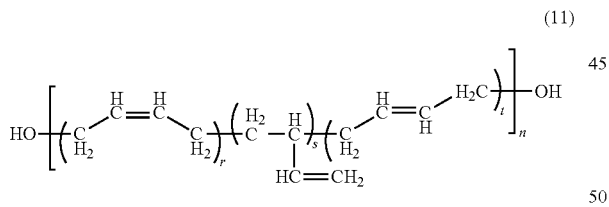

where r, s, and t each independently represent a number of from 1 to 20, and n represents a number of from 1 to 50;

(12)
OCN—R₄—NCO (12a)
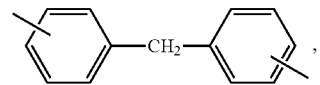

(12b)

(12c)

(12d)

-continued (12e)
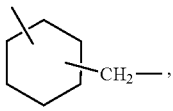

(12f)
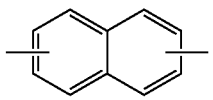

in the formula 12, $R_4$ represents a divalent group selected from the formulae 12a to 12f;

(13)
HO—R₅—OH (13a)

in the formula 13, $R_5$ represents an alkylene group represented by the formula 13a and g represents a number of from 1 to 10.

3. A polyurethane-modified epoxy resin according to claim 1 or 2, wherein the epoxy resin (a) comprises a bisphenol A-type epoxy resin represented by the following formula (14) or a bisphenol F-type epoxy resin represented by the following formula (15), the medium to high molecular weight polyol compound (b) comprises a polypropylene glycol represented by the following formula (16), the low molecular weight polyol compound (d) comprises 1,4-butanediol represented by the following formula (17), and the polyisocyanate compound (c) comprises 4,4'-diphenylmethane diisocyanate represented by the following formula (18):

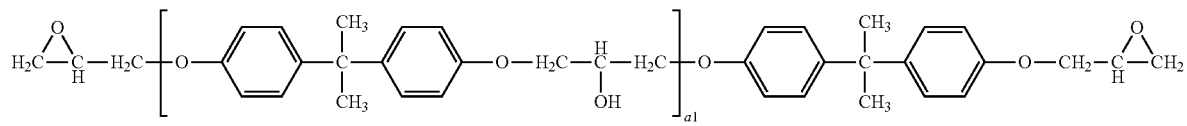

(14)

where a1 represents a number of from 0.148 to 0.198 as average value;

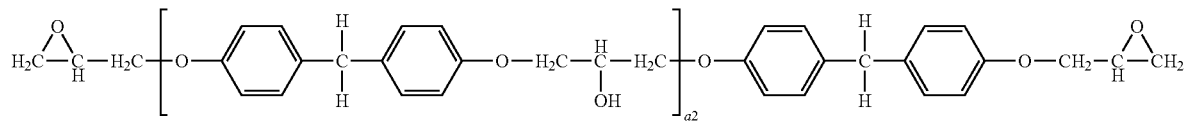

(15)

where a2 represents a number of from 0.134 to 0.149 as average value;

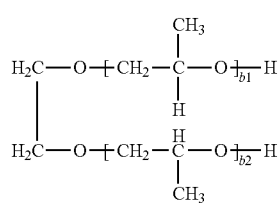

(16)

where b1 and b2 each independently represent a number of from 1 to 50.

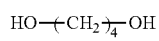

(17)

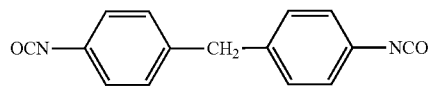

(18)

4. A method of producing the polyurethane-modified epoxy resin of claim 1, comprising:
producing the urethane prepolymer (P) by causing the medium to high molecular weight polyol compound (b) and the polyisocyanate compound (c) to react with each other in a presence of the epoxy resin (a), wherein the epoxy resin (a) is reacted in an amount of from 20 wt % to 40 wt % with respect to a total amount of the components (a), (b), (c), and (d), and the components (b) and (c) are reacted in an amount such that a molar ratio between primary OH groups of the component (b) and NCO groups of the component (c) falls within a range of from 1:1.5 to 1:3; and
then subjecting the urethane prepolymer (P) to a polyurethanation reaction by adding the low molecular weight polyol compound (d) so that a molar ratio between NCO groups of the urethane prepolymer (P) and OH groups of the low molecular weight polyol compound (d) falls within a range of from 0.9:1 to 1:0.9.

5. A method of producing the polyurethane-modified epoxy resin according to claim 4, wherein the bisphenol-based epoxy resin (a) comprises a bisphenol A-type epoxy resin.

6. An epoxy resin composition, which is obtained by blending the polyurethane-modified epoxy resin of claim 1 with a polyurethane-unmodified epoxy resin (e), a curing agent (f), and a curing accelerator (g), wherein the composition has a weight concentration of polyurethane constituent components of from 10 wt % to 30 wt %.

7. An epoxy resin cured product, which is obtained by curing the epoxy resin composition of claim 6.

8. A polyurethane-modified epoxy resin according to claim 1, wherein the bisphenol-based epoxy resin (a) comprises a bisphenol A-type epoxy resin.

* * * * *